United States Patent [19]

Whitehead

[11] 4,206,899

[45] Jun. 10, 1980

[54] APPARATUS FOR MOLDED ICE SCULPTURE

[76] Inventor: Arthur L. Whitehead, 693 St. George Rd., San Ramon, Calif. 94583

[21] Appl. No.: 927,180

[22] Filed: Jul. 24, 1978

[51] Int. Cl.² .......................... B22C 9/22; B28B 7/06; B29C 1/16

[52] U.S. Cl. ...................................... 249/139; 249/55; 249/127; 249/134; 264/28; 264/313; 264/314; 425/DIG. 44

[58] Field of Search ................. 249/139, 55, 134, 120, 249/127; 425/DIG. 44; 264/222, 313, 316, 28

[56] References Cited

U.S. PATENT DOCUMENTS

| | | | |
|---|---|---|---|
| 662,561 | 11/1900 | Ford | 249/134 |
| 1,163,472 | 12/1915 | Seavey | 249/139 |
| 1,873,081 | 8/1932 | Von Witzki | 249/134 |
| 2,220,018 | 10/1940 | McKenna | 264/313 |
| 2,330,732 | 9/1943 | Oestrike | 264/316 |
| 2,367,098 | 1/1945 | Cole | 249/134 |
| 2,435,285 | 2/1948 | Lucia | 425/DIG. 44 |
| 2,961,849 | 11/1960 | Hitchcock | 249/134 |
| 2,981,997 | 5/1961 | Painter | 249/134 |
| 2,991,532 | 7/1961 | Stiles | 249/134 |
| 3,166,792 | 1/1965 | Goldfarb | 249/134 |
| 3,168,604 | 2/1965 | Kramer et al. | 264/313 |
| 3,245,648 | 4/1966 | Johansson et al. | 425/DIG. 44 |
| 3,347,966 | 10/1967 | Seefluth | 425/DIG. 44 |
| 3,752,433 | 8/1973 | Berman | 249/134 |
| 3,883,287 | 5/1975 | Grawey et al. | 425/DIG. 44 |
| 3,982,721 | 9/1976 | Maurino et al. | 425/DIG. 44 |
| 4,017,051 | 4/1977 | Scott et al. | 249/134 |

*Primary Examiner*—Murray Tillman
*Assistant Examiner*—Arthur H. Koeckert

[57] ABSTRACT

A method and apparatus for forming molded ice sculptures includes a selection of molds fabricated of form retaining, flexible, resilient plastic material. Each mold includes holes in the base thereof through which supporting wires are placed. The mold is inverted, base up, within a box slightly larger than the mold, with the wires impinging on the box and supporting the mold. The mold is filled with water and frozen. Thereafter the mold is removed from the box, the wires removed from the mold and the mold stripped from the frozen sculpture.

2 Claims, 3 Drawing Figures

APPARATUS FOR MOLDED ICE SCULPTURE

BACKGROUND OF THE INVENTION

Ice sculptures have long been renown for their esthetic appearance, due primarily to the smoothly flowing surfaces of the ice and to the clarity of the light transmitted therethrough. Ice sculptures have often been used as festive decorations for banquets, celebrations, and festive occasions.

In the past, ice sculptures have been fabricated from large blocks of ice, using special tools to chip, form, and smooth the ice. In this process, a great deal of the mass of ice in the original block is lost and wasted. Moreover, the labor involved in forming the ice sculpture has resulted in generally high cost associated with purchasing an ice sculpture. Thus ice sculptures have been available only to those few individuals having sufficient wealth to purchase them.

SUMMARY OF THE PRESENT INVENTION

The present invention generally comprises a method and apparatus for forming an ice sculpture. It includes a selection of molds in attractive shapes which are used to freeze water to form the ice sculpture. Using the molds, no ice is wasted in the fabrication of the sculpture. Moreover, the present invention provides an inexpensive manner for forming ice sculptures, so that ice sculptures may be made available to the general public at low costs. The molds of the present invention are formed of a form retaining, resilient, flexible plastic material, such as vinyl or the like. Each mold includes a single cavity having interior surface features designed to produce the desired exterior surface features of the finished ice sculpture. The cavity has only one opening at the base of the mold.

Disposed in the base of the mold are two pair of holes, each pair being aligned generally diametrically across the opening at the base of the mold. A wire is inserted through each pair of holes, extending outwardly from the mold for a short distance. The mold is then supported in an inverted position in an upwardly opening box, the wires resting on the edges of the box opening. In the inverted position, the base and opening of the mold is uppermost.

The mold is then filled with water, which may be colored, and is placed in the freezer compartment of a refrigerator or the like. After the water within the mold has frozen completely, the mold and the box are removed from the freezer, and the mold is removed from the box. The wires are then removed from the holes in the mold, and the mold is peeled from the frozen sculpture, the mold being turned inside out as it is removed from the sculpture. The ice sculpture is then finished, and may be used immediately or stored for future use. The mold may be restored to its outside out configuration, and reused many times to produce many ice sculptures.

A BRIEF DESCRIPTION OF THE DRAWING

DESCRIPTION OF THE PREFERRED EMBODIMENT

Figure 1:
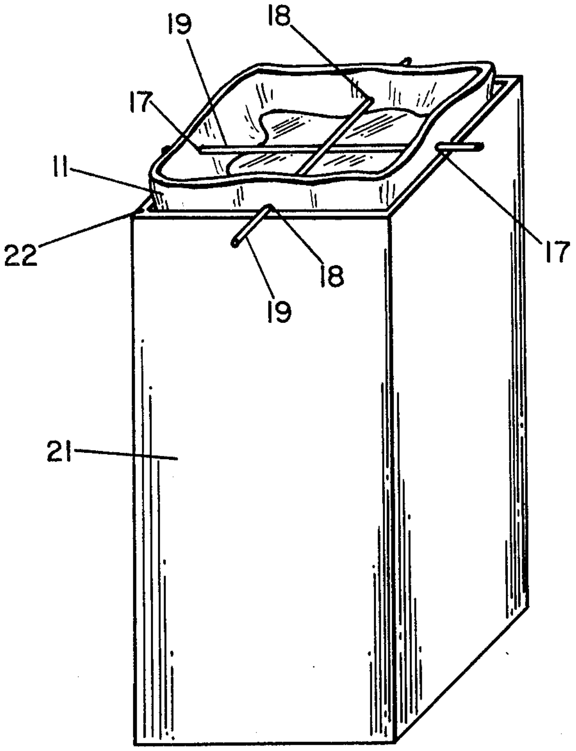
FIG. 1 is a perspective view of the ice sculpture molding assembly of the present invention.
Figure 2:
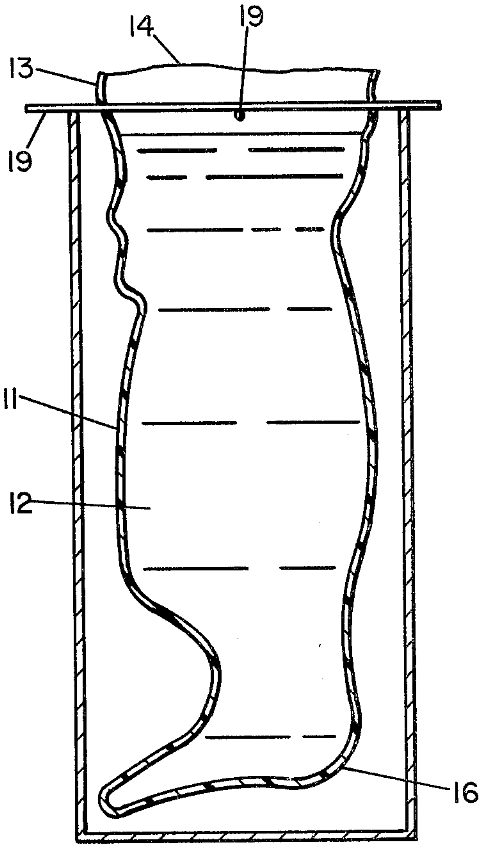
FIG. 2 is a cross-sectional elevation of the ice sculpture molding assembly of the present invention.

With reference to FIGS. 1 and 2, the ice sculpture molding assembly of the present invention comprises a mold 11 which includes an interior cavity 12 in the desired configuration of the ice sculpture. The mold 11 is preferably formed of a form retaining, flexible, resilient material, such as polyvinyl or the like. Although many other materials may be used, an important property of the material used is that it remain resilient and flexible at temperatures below zero degrees centigrade. In the preferred embodiment, the material is approved by the Food and Drug administration, so that edible materials may be frozen in the molds.

The mold 11 includes a base end 13 which is provided with a large opening 14 communcating with the cavity 12 within. The other end 16 of the mold is closed, so that the mold may be placed in an inverted position, base end 13 uppermost, to be filled with water. Although in the preferred embodiment the mold is shown in the general configuration of a representation of a penguin, it may be appreciated that other subjects real or imaginary may form the basis for designing the mold 11.

Disposed in the base end 13 of the mold 11 are two pairs of holes 17 and 18. Each pair of holes is situated adjacent to the opening 14, with each pair being disposed in opposing relationship with respect to the opening 14. A pair of metal support wires 19 are received through the holes 17 and 18, extending across the opening 14. Further pairs of holes and support wires may be provided for large molds.

The invention also includes a box 21 having stiff, form retaining sides and bottom, and also having an open upper end 22. The distal ends of the wires 19 are adapted to rest on the upper ends 22, supporting the mold 11 in the inverted position shown in FIGS. 1 and 2. In this manner almost all of the mold 11 is received within the box 21. It should be noted that the interior of the box is larger than the external dimensions of the mold 11, so that the mold does not contact the box.

The box 21 serves dual purposes: it supports the mold 11 in an inverted position so that the mold may be filled with liquid, and it also protects the flexible mold from external impingement which might distort the shape of the mold. Of course, once the water within the mold is frozen, it retains the shape provided by the mold 11. If the mold extremities do not fit within the box (i.e. the beak of a duck, a die cut hole may be placed appropriately in the box so that the mold extremity extends therethrough.

To use the ice sculpture molding assembly of the present invention, the mold 11 is first washed with detergent in warm water and rinsed thoroughly. The wires 19 are then inserted through the holes 17 and 18, as shown in FIG. 1. The mold is then inverted and placed inside the box 21, with the ends of the wires 19 resting on the opening 22 of the box. The mold is then hanging freely within the box.

The mold is then filled with water to a level just below the wires 19. Food coloring may be added to the water prior to filling to create a tinted ice sculpture. If a highly transparent ice sculpture is desired, hot water may be used to fill the mold.

When the water within the mold is completely frozen, the mold is removed from the box 21. For easy release of the mold from the ice, the mold is allowed to remain at room temperature for a few minutes. The support wires 19 are then removed from the holes 17 and 18.

Figure 3:
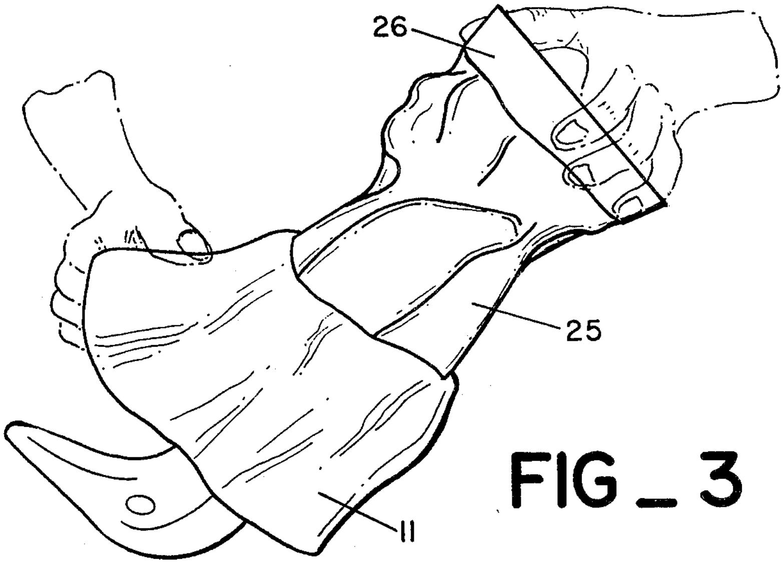
FIG. 3 is a perspective view showing the mold of the present invention being removed from a frozen ice sculpture.

To remove the mold 11 from the ice sculpture therein, the mold is grasped at its opening 14 and gradually peeled away from the ice sculpture 25, as shown in FIG. 3. As this is done the mold 11 is turned inside out. When the mold 11 is completely removed from the sculpture 25, the sculpture may be supported on its base 26 in a container having sufficient capacity to contain the runoff from the melting sculpture.

The mold 11 may then be returned to its outside out configuration, and reused numerous times. Because the mold may be reused many times, ice sculptures may be produced very economically and very simply.

As shown in the accompanying figures, the present invention is capable of forming figures and representations of figures which include concave, convex, and reentrant portions. It is not possible to form such surfaces using a unitary rigid mold, due to the fact that it is impossible to remove such a figure from the mold. However, due to the flexible, resilient nature of the material which forms the mold of the present invention, it is possible to peel the mold away from the frozen ice as explained in the foregoing. Thus the flexibility and resiliency of the mold 11, even at temperatures below zero degrees centigrade, is a critical factor in permitting the casting of intricately formed sculptures from a unitary mold.

What is claimed is:

1. Apparatus for forming an ice sculpture, comprising:

a unitary mold having a cavity therein and an internal surface configuration substantially identical to the shape of said ice sculpture, said cavity having an opening in one end of said mold; said mold being constructed of a resilient non-self supporting material that is adapted to be peeled away inside out from said ice sculpture in a unitary manner, beginning at said one end.

a container having upper edges for receiving said mold with said one end uppermost; and means for supporting said mold in said container with said one end uppermost to retain a charge of liquid which is subsequently frozen therein, said supporting means including at least two elongated wire members and means in the walls of said mold adjacent said one end for passing opposed ends of each of said wire members through opposed walls of said mold so that the mid-portion of each said wire members extends across the one end opening so that the outermost ends of said wire members respectively engage the edges of said container to suspend said mold within said container.

2. The apparatus of claim 1, wherein said mold is fabricated of a thin, form-retaining material which is resilient at the freezing temperature of said ice sculpture.

* * * * *